3,166,534
PROCESS FOR PRODUCTION IN AQUEOUS MEDIUM OF COPOLYMERS OF VINYL CHLORIDE WITH MONOMERS CONTAINING FREE CARBOXYLIC ACID GROUPS
Lyle Eugene Perrins, St. Albans, England, assignor to Imperial Chemical Industries Limited, London, England, a corporation of Great Britain
No Drawing. Filed Oct. 27, 1961, Ser. No. 148,045
Claims priority, application Great Britain, Nov. 4, 1960, 37,950/60
8 Claims. (Cl. 260—80.5)

This invention relates to improvements in the production of vinyl chloride polymers and more particularly to the production of vinyl chloride polymers which will adhere to metals.

It is known that vinyl chloride polymers containing a small proportion of a copolymerised monomer containing free carboxyl groups may be prepared which will adhere to metals. Such copolymers may be applied to the metal in the form of pastes incorporating a plasticiser and the paste may be subsequently gelled by heating. Alternatively, the metal may be heated to a temperature above the softening point of the copolymer and brought into contact with the copolymer in powder form. Particles of the copolymer then adhere to the metal and may be converted into a continuous film by further heating. The copolymer may also contain a proportion of a third copolymerised monomer, e.g. vinyl acetate, which renders it soluble in organic solvents, and may then be applied to the metal in the form of a solution.

It is known that vinyl chloride polymers containing free carboxyl groups may be obtained by polymerising the monomers (e.g. vinyl chloride and maleic acid) in a common solvent therefor. However, while the products of this process have been found to adhere particularly well to metals, they are in general of low molecular weight and consequently have inferior mechanical and electrical properties.

Polymerization in solution also tends to be rather slow compared with polymerisation in aqueous medium and in an effort to obviate some of the disadvantages of solution polymerisation it has been proposed to add to the solvent small amounts of water. It has been found, however, that the amounts of water used must be kept low enough for the polymerisation medium to consist of a single homogeneous phase at the polymerisation temperature since otherwise turbidity sets in. The process, therefore, still requires the presence of large amounts of solvent.

Preparation of vinyl chloride polymers containing free carboxyl groups by aqueous suspension polymerisation techniques using a monomer soluble catalyst has met with little success hitherto owing to the high solubility in water of the monomer containing the carboxylic group or groups. Because of this high solubility, the resulting copolymer contains usually only a low percentage of combined carboxyl groups and therefore has only poor adhesive strength. This is unfortunate because suspension polymerisation processes are in general cheaper and more easily carried out than bulk or solution polymerisation processes.

It has also been proposed to conduct the copolymerisation in aqueous medium containing some water-miscible organic solvent and in the total absence of a dispersing agent. This is said to result in a fast polymerisation and to give uniform granular polymer in high yields but I have found that this process gives a product in the form of coarse granules and often additionally in the undesirable form of heavy build-up in the reaction vessel.

I have now found that vinyl chloride polymers containing free carboxyl groups and having good adhesive properties combined with good mechanical and thermal properties may be prepared by a polymerisation process in aqueous suspension in which both a dispersion agent and a water-miscible solvent are present.

Accordingly, I provide a process for the preparation of vinyl chloride polymers containing free carboxyl groups which comprises copolymerising vinyl chloride and a monoethylenically unsaturated carboxylic acid, or an anhydride or an acid chloride of such an acid, or a partial ester of a monoethylenically unsaturated polycarboxylic acid alone or together with other copolymerisable monomers in the presence of a dispersion agent and in an aqueous medium containing from 5 to 25% by weight of the water of a water-miscible organic solvent or water-miscible mixture of organic solvents.

Incorporating below 5% of the water miscible organic solvent or mixture of solvents gives rise to only a small increase in the carboxyl content of the copolymer over that obtained from equivalent conventional suspension polymerisation processes, and consequently only a small increase in metal adhesion properties, and I prefer to use at least 8% since then copolymers with very good metal adhesion properties are obtained. On the other hand, using more than 25% of organic solvent gives no further useful increase in combined carboxyl content of the copolymer. I prefer to use no more than 20% in our process since in general there is no commercial advantage in the copolymers obtained by processes in which larger quantities are used.

Examples of water miscible organic solvents which may be used in the process of my invention include alcohols of low molecular weight such as methyl alcohol, ethyl alcohol, n-propyl alcohol, iso-propyl alcohol, n-butyl alcohol, isobutyl alcohol and n-amyl alcohol; glycols such as methylene glycol, ethylene glycol and n-butyl glycol; esters of low molecular weight such as methyl acetate, ethyl acetate, isopropyl acetate, n-propyl acetate, ethyl propionate, ethyl butyrate and amyl acetate and ketones such as acetone and methyl ethyl ketone. Mixtures of two or more of these solvents may be used and other organic solvents which are normally substantially immiscible with water may also be added in small quantities to the water miscible solvent or solvents and form a mixture of organic solvents which is still miscible with water in the proportions desired. However the addition of a water-immiscible solvent is in general undesirable unless it is used for a specific purpose such as, for example, introducing the catalyst into the polymerisation medium.

Suitable monoethylenically unsaturated acids for use in the process of the invention include, for example, maleic, fumaric, acrylic, methacrylic, crotonic, itaconic and aconitic acids. Suitable partial esters of monoethylenically unsaturated polycarboxylic acids include, for example mono-esters particularly the mono-alkyl esters of maleic, fumaric and itaconic acids and mono or di-esters of aconitic acid.

The proportion of the monoethylenically unsaturated carboxylic acid, acid anhydride, acid chloride or partial ester of a monoethylenically unsaturated carboxylic acid employed is preferably not less than 0.3% of the total weight of polymerisable compounds employed as the copolymers obtained then adhere particularly well to metals. On the other hand, the proportion of this component preferably does not exceed 10% otherwise the heat stability of the copolymer is liable to be impaired. Particularly suitable proportions of this component are from 0.3 to 4%.

The presence of a dispersion agent is essential to this process since if the process is carried out in the absence of a dispersion agent it has been found that the polymer is generally produced in the form of coarse granules and often additionally in the form of heavy build-up in the reaction vessel. Not only does this give rise to considerable difficulty in controlling the temperature of the polymerisation but it is very difficult to dry the polymer so produced. Examples of dispersion agents suitable for our process include gelatine, polyvinyl alcohol, starch, methyl cellulose, glycol cellulose, and other high molecular weight water soluble polymers such as the polyalkylene oxides.

Examples of suitable polymerisation catalysts include organic peroxides and hydroperoxides, e.g. acetyl peroxide, tertiary butyl peroxide, lauryl peroxide and succinyl peroxide; hyponitrous esters, e.g. benzyl hyponitrite and azo compounds having molecules containing the group →C—N=N—C← in which the two carbon atoms are non-aromatic in character, e.g. αα' bis (aγ dimethyl valeronitrile) and azo di-isobutyronitrile. The catalyst may conveniently be added to the monomeric materials as a solution in an organic solvent e.g. chloroform. Suitable concentrations of catalyst usually lie between 0.01 and 1% by weight of polymerisable compounds employed.

Chain-transfer agents such as chloroform or tetrachloroethylene may be used if desired to control the molecular weight of the copolymer formed.

The polymers prepared by this process should preferably have K values of not less than 35 as measured by the method described by Fikentscher in Celluloschemie, 13 (1932), pp. 58 et seq. using ethylene dichloride as the solvent, otherwise the copolymer tends to be brittle. To this end, the polymerisation is preferably carried out at temperatures of from 35 to 80° C.

In the process of the present invention polymerisable compounds other than those hereinbefore specified may also be present if desired. Small proportions of other polymerisable compounds may be included for example to reduce the softening point of the resulting copolymer or to increase its solubility in organic solvents. Examples of other polymerisable compounds which may be present include vinyl esters of saturated monocarboxylic acids, methacrylonitrile and acrylonitrile; particularly suitable vinyl esters include those of formic, acetic, propionic and butyric acids. If such a vinyl ester is included as a co-monomer in the process of the present invention, the proportion employed preferably should not exceed about 40% and preferably lies between 7 and 20% of the total weight of polymerisable compounds employed.

Typical applications for copolymers produced by the process of this invention include heat-sealable coatings on aluminium foil and lacquers for beer cans and they may also be used for coating glass and wood surfaces.

My invention is illustrated but in no way limited by the following examples in which all parts are expressed as parts by weight.

*Example 1*

In this example a series of polymerisations were carried out in order to show the combined carboxyl contents achieved in polymers resulting from polymerisations using different water miscible organic solvents in the medium. A blank was also carried out having no water miscible organic solvent in the medium in order to show the considerable increase in combined carboxyl content when such an organic solvent is used in accordance with the process of my invention.

In each of the polymerisations, the ingredients and quantities were as follows:

| | Parts |
|---|---|
| Distilled water and water miscible organic solvent | 100 |
| Catalyst: Lauroyl peroxide | 0.192 |
| Vinyl chloride | 46.7 |
| Vinyl acetate | 8.73 |
| Maleic acid | 1.54 |
| Methyl cellulose whose 2% solution has a viscosity of 15 c.p.s. at 20° C. | 0.250 |

The distilled water and organic solvent (where applicable) were charged into a stainless steel pressure vessel equipped with a stirrer and the methyl cellulose dispersing agent was added followed by the catalyst and the unsaturated acid. The vessel was then purged thoroughly with nitrogen in order to remove the oxygen and the vinyl chloride and vinyl acetate were charged. The mixture was stirred and brought to the polymerisation temperature of 50° C.

After the pressure in the vessel had fallen to 50 p.s.i. the vessel was vented, the slurry of polymer in water filtered and the filter cake dried.

The table below shows the relative amount of organic solvent used in each experiment and the combined carboxyl content of the copolymer obtained. In all cases the product on drying was a fine powder. The powder was dissolved in methyl ethyl ketone and aluminium foil was coated from the solution. The coating was readily heat-sealed to itself and showed very good polymer-to-metal adhesion.

| Experiment | Organic Solvent | Parts of Solvent | Combined Carboxyl Content of Copolymer, percent |
|---|---|---|---|
| A | Nil | 0 | 0.1 |
| B | Isopropanol | 15 | 0.75 |
| C | Methanol | 15 | 0.5 |
| D | Acetone | 15 | 0.67 |
| E | Isopropanol / Methanol | 5 / 10 | 0.55 |

*Example 2*

The process of Example 1 was repeated in three further polymerisation in which the same weight of azo-diisobutyronitrile replaced the lauroyl peroxide as catalyst. The product in all cases was a fine powder readily soluble in methyl ethyl ketone and giving coatings of good adhesion and attractive appearance.

| Equipment | Organic Solvent | Parts of Solvent | Combined Carboxyl Content of Copolymer, percent |
|---|---|---|---|
| F | Methyl ethyl ketone | 15 | 0.30 |
| G | Isopropanol | 15 | 0.76 |
| H [1] | Methyl ethyl ketone | 8 | 0.59 |

[1] The polymerisation was carried out at 60° C. instead of 50° C.

*Example 3*

The process of Example 2 was repeated using itaconic acid instead of maleic acid and a blank was also carried out in which no organic solvent was present in order to show the considerable increase in combined carboxyl content in the copolymer when such a solvent is added to the polymerisation recipe. The products in both experiments shown below were fine powders.

| Equipment | Organic Solvent | Parts of Solvent | Combined Carboxyl Content of Copolymer, percent |
|---|---|---|---|
| J | Nil | 0 | 0.27 |
| K | Industrial ethanol | 15 | 0.68 |

Polymerisations using methyl acetate instead of industrial ethanol gave similar results.

*Example 4*

For the purposes of comparison the process of Example 2H was repeated but the polymerisation was carried out in the absence of the methyl cellulose solution as dispersion agent.

In this case the copolymer was produced in the form of coarse granules and heavy build up occurred in the reaction vessel. The product was extracted with difficulty from the pressure vessel and drying was also very difficult.

*Example 5*

For the purposes of comparison, the process of Example 2G was repeated, the polymerisation being carried out in the absence of the methyl cellulose solution as dispersion agent.

The polymer formed was mainly in the form of coarse granules and build up also occurred to a certain extent in the vessel. The polymer was very difficult to extract and presented difficulty in drying.

I claim:
1. A process for the preparation in aqueous medium of a vinyl chloride polymer containing free carboxyl groups which comprises copolymerizing together a monomeric mixture selected from the group consisting of
   (i) a mixture of (a) vinyl chloride
      and (b) a monomer containing a free carboxylic acid group under the conditions of polymerization and selected from the group consisting of mono-ethylenically unsaturated mono- and polycarboxylic acids containing from three to six carbon atoms, anhydrides and acid chlorides of said acids and partial esters derived from mono-ethylenically unsaturated polycarboxylic acids containing from four to six carbon atoms and alcohols containing from one to six carbon atoms
   and (ii) a mixture of $a$, $b$ and (c) a monomer selected from the class consisting of acrylonitrile, methacrylonitrile and vinyl esters of saturated monocarboxylic acids containing from one to four carbon atoms in the presence of a high molecular weight water soluble polymer as a dispersing agent and a monomer-soluble free radical polymerization catalyst and in an aqueous medium containing from 5% to 25% by weight of the water of at least one organic compound which is a liquid solvent miscible with water in the proportion used and under the conditions of the polymerization.

2. A process according to claim 1 in which the aqueous medium contains from 8 to 20% by weight, based on the weight of water, of said organic compound.

3. A process according to claim 1 in which (b) is present in an amount of from 0.3 to 10% by weight of the total weight of polymerizable monomers.

4. A process according to claim 1 in which (b) is present in an amount of from 0.3 to 4% by weight of the total weight of polymerizable monomers.

5. A process according to claim 1 in which (c) comprises not more than 40% of the total weight of polymerizable monomers.

6. A process according to claim 1 in which (c) comprises from 7 to 20% of the total weight of polymerizable monomers.

7. A process according to claim 1 in which (b) is maleic acid and (c) is vinyl acetate.

8. A process according to claim 1 in which said copolymerization is carried out at 35–80° C.

References Cited by the Examiner
UNITED STATES PATENTS

| 2,187,817 | 1/40 | Hopff et al. | 260—78.5 |
| 2,397,724 | 4/46 | Cass | 260—87.1 |
| 2,492,087 | 12/49 | Baer | 260—87.1 |
| 2,492,089 | 12/49 | Baer | 260—87.1 |
| 3,004,009 | 10/61 | Dell | 260—87.1 |
| 3,068,211 | 12/62 | Deanin | 260—87.1 |

OTHER REFERENCES

Schildknecht: "Vinyl and Related Polymers," page 401, Wiley (1957).

Hackh's "Chemical Dictionary," 3rd edition (1944).

JOSEPH L. SCHOFER, *Primary Examiner.*

H. N. BURSTEIN, WILLIAM H. SHORT, JAMES A. SEIDLECK, *Examiners.*